M. J. PALMER.
Churn Dasher.
No. 34,770. Patented March 25, 1862.
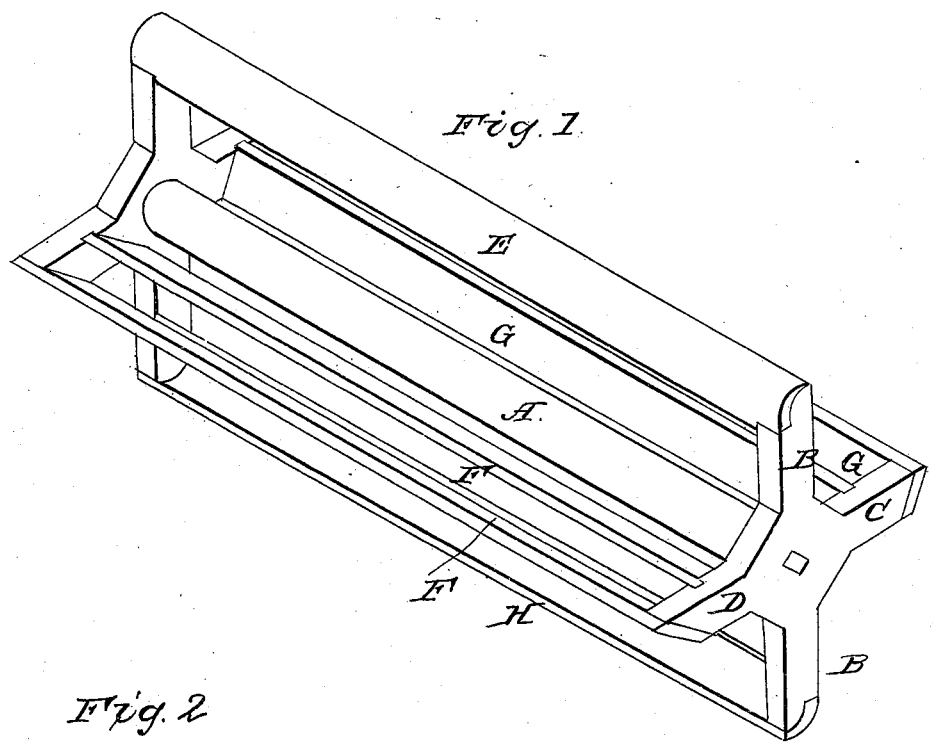
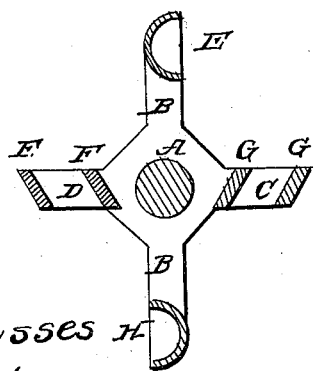

UNITED STATES PATENT OFFICE.

MILTON J. PALMER, OF HOMER, NEW YORK.

IMPROVEMENT IN CHURN-DASHERS.

Specification forming part of Letters Patent No. 34,770, dated March 25, 1862.

*To all whom it may concern:*

Be it known that I, MILTON J. PALMER, of Homer, in the county of Cortland and State of New York, have invented a new and Improved Churn-Dasher; and I do hereby declare that the following is a true, full, and exact description thereof, reference being had to the accompanying drawings, and to the letters of reference marked thereon.

Figure 1 is a perspective view, and Fig. 2 an end view, of the dasher, like letters referring to like parts in each.

The object of my invention is to force air into the cream with each semi-revolution of the dash, at the same time, by means of slats or floats inclining in opposite directions from the shaft, to prevent a rotary motion in the cream and yet keep the whole in constant motion.

To enable others to make and use my invention, I will proceed to describe its construction and operation.

A is the shaft, to which is attached the arms B B, these arms on the same side of the shaft being connected by the slats E H, grooved in the shape of the letter U and parallel with the shaft. These grooves face in opposite directions and are closed at the ends when attached to the arms. At right angles to the arms B B are the arms C D, shorter than B B. These are connected by the slats or floats F F G G parallel with the shaft A, F F upon the one side inclining in an opposite direction from G G on the other side.

The arrow shows the direction in which the dasher should revolve. Upon turning the dasher the grooved slats H E, as they alternately rise above cream, carry air in the groove into the cream and it becomes diffused through the mass. The slats or floats G G in their passage, by means of their inclination, throw the cream from the center, and the floats F F follow immediately and, inclining in the opposite direction, throw the cream toward the center. The whole mass is thus kept in motion and in turn brought into contact with the air forced in by the grooved air-chambers in the slats H E. The butter in all the cream is consequently brought at the same time and is gathered by the floats F F and G G.

I claim and desire to secure by Letters Patent—

A horizontal churn-dasher with the slats or floats inclining in opposite directions upon opposite sides of the shaft, in combination with bars parallel with the shaft, with the horizontal U-shaped grooves closed at the ends, and so forming an air-chamber as they pass into the cream.

MILTON J. PALMER.

Witnesses:
 CHAS. FOSTER,
 STEPHEN R. HUNTER.